US006624416B1

United States Patent
Bardo et al.

(10) Patent No.: US 6,624,416 B1
(45) Date of Patent: Sep. 23, 2003

(54) UNCOOLED NIOBIUM TRISULFIDE MIDWAVELENGTH INFRARED DETECTOR

(75) Inventors: Richard D. Bardo, Adelphi, MD (US); Peter J. Sarman, Ashburn, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 165 days.

(21) Appl. No.: 09/912,748

(22) Filed: Jul. 26, 2001

(51) Int. Cl.[7] .................................................. G01J 5/10
(52) U.S. Cl. .................................................. 250/338.1
(58) Field of Search ....................................... 250/338.1

(56) References Cited

U.S. PATENT DOCUMENTS

| 3,864,167 A | | 2/1975 | Broadhead et al. | |
|---|---|---|---|---|
| 4,091,191 A | | 5/1978 | Gaines | |
| 4,591,717 A | * | 5/1986 | Scherber | 250/338.1 |
| 4,728,588 A | | 3/1988 | Noding et al. | |
| 4,892,795 A | | 1/1990 | Fang et al. | |
| 4,963,161 A | | 10/1990 | Chi et al. | |
| 4,988,587 A | | 1/1991 | Ter Haar et al. | |
| 5,294,333 A | | 3/1994 | Breysse et al. | |

FOREIGN PATENT DOCUMENTS

| DE | 3316027 A1 | * | 11/1984 | H01J/1/78 |
|---|---|---|---|---|

OTHER PUBLICATIONS

J. L. Miller, *Principles of Infrared Technology—A Practical Guide to the State–of–the–Art*, Van Nostrand Reinhold, John Wiley & Sons, Inc., New York, 1994, Ch. 4 entitled "Focal Plane Arrays," pp. 106–192), Ch. 9 (entitled "Smart Weapon Seekers," (pp. 370–394), Ch. 10 (entitled FLIRs and IRSTs, pp. 395–449).

R. Sobolewski, "Ultrafast Dynamics of Nonequilibrium Quasiparticles in High Temperature Superconductors," in *Proceedings of SPIE*, Vol 3481, Jul. 20–24, 1998, pp. 480–491.

M. G. Forrester and J. Talvacchio, "Photon Detection by High Temperature Superconducting Films: Fundamental Limits," *Physica C*, Vol 162–164, pp. 391–392 (1989).

P.J. Sarman, R.D. Bardo and R. Chen, "Charge Density Wave Materials," *FY98 NSWC Carderock Division Research Digest*, Naval Surface Warfare Center, Carderock Division, CARDEROCKDIV–99/CT01, Mar. 1999, pp. 73–75.

P.J. Sarman, R.D. Bardo and R. Chen, "Charge Density Wave Materials," *FY99 NSWC Carderock Division Research Digest*, Naval Sea Systems Command, Naval Surface Warfare Center, Carderock Division, CARDEROCKDIV–00/CT01, Mar. 2000, pp. 48–50.

* cited by examiner

*Primary Examiner*—Constantine Hannaher
(74) *Attorney, Agent, or Firm*—Howard Kaiser (57) ABSTRACT

Incident infrared radiation of a particular polarity is sensed by a set of Niobium Trisulfide ($NbS_3$) crystal fibers which are fixed in parallel upon a substrate. In order to detect unpolarized or variously polarized infrared radiation, plural substrates, each having associated therewith its own such set of parallel fibers, can be coplanarly arrayed whereby different angles are described by different sets of parallel fibers; for instance, 0-degree, 45-degree, 90-degree and 135-degree angles can each be described by one or more sets of parallel fibers within a given array. The crystalline fibrous Niobium Trisulfide material is not a semiconductor material but rather is a "charge density wave" material having special attributes. The invention thus offers more economical operability at much higher temperatures when compared with conventional infrared-photosensitive materials, and is especially suitable for detecting midwavelength infrared radiation.

14 Claims, 4 Drawing Sheets

UNCOOLED NIOBIUM TRISULFIDE MIDWAVELENGTH INFRARED DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods, apparatuses and compositions pertaining to infrared radiation detection, more particularly to the photon detection of infrared radiation such as associated with thermal emissions.

The electromagnetic spectrum has conventionally been divided into approximate regions according to wavelength. The visible region, approximately in the range between 400 nm and 700 nm, corresponds to electromagnetic radiation to which the human eye is sensitive (visible light). The regions of successively shorter wavelengths than the visible region are ultraviolet, x-rays and gamma rays. The regions of successively longer wavelengths than the visible region are the near infrared, infrared and radio waves.

The near infrared region (NJR) approximately encompasses the 700 nm to 1 $\mu$m range. The infrared region approximately encompasses the 1 $\mu$m to 100 $\mu$m range. The infrared region is approximately subdivided into: short wave infrared (SWIR), having wavelengths approximately between 1 $\mu$m and 3 $\mu$m; midwave infrared (MWIR), having wavelengths approximately between 3 $\mu$m and 5 $\mu$m; and, long wave infrared (LWIR), having wavelengths longer than about 8 $\mu$m and up to about 100 $\mu$m. The region between MWIR and LWIR is conventionally disregarded due to strong atmospheric absorption. Radio waves have wavelengths longer than about 100 $\mu$m.

An electromagnetic radiation detector (also referred to as a photodetector, or an electromagnetic radiation sensor, or an electro-optic detector or sensor) is a device which absorbs electromagnetic radiation and gives rise to an electrical output signal that, generally speaking, is proportional to the irradiance (the intensity of the incident electromagnetic radiation). Depending on the type of detector, the output signal will be either a voltage or a current. In comparison with thermal detectors, photon detectors are characterized by a higher speed of response. Current semiconductor photon detectors having long wavelength limits in the ultraviolet, visible or near infrared (up to 2–3 $\mu$m) operate uncooled at room temperature (300 degrees kelvin, or 300 K). At longer, midwavelength infrared (MWIR) limits (up to 4–5 $\mu$m), cooling to dry ice temperature (195 K) is required. For detectors operating in the long wavelength infrared (LWIR) 8–12 $\mu$m range, cooling to liquid nitrogen temperature (77 K) is essential.

Because all bodies at temperatures greater than absolute zero radiate in the infrared radiation region, infrared radiation detection has been of importance in military applications. By employing infrared radiation detection (e.g., via infrared "seekers"), warm targets can be detected in the dark by virtue of their own infrared radiation, thus obviating the need to illuminate such targets in order to render them visible. Warm bodies emit infrared radiation, and bodies which absorb infrared radiation are warmed. It is incorrect, however, to call infrared radiation "heat radiation," because the radiation itself is not "heat."

Higher operating temperature has been a goal of infrared detection development for the last few decades. Direct bandgap alloy semiconductor-materials such as HgCdTe replaced extrinsic germanium and silicon devices for LWIR applications because they could operate under ambient background flux conditions at 80 K. It has been thought that, theoretically at least, if 12 $\mu$m detectors could operate at 80 K, then 5 $\mu$m detector operation at 180 K should be possible.

At MWIR wavelengths, InSb has remained the infrared detector of choice for many applications. InSb has a spectral cutoff at 5.5 $\mu$m at 80 K, but its bandgap of 0.22 eV narrows as the temperature increases, extending its spectral response into the water vapor band between 5.5 and 7.5 $\mu$m, and also resulting in a very rapid increase in thermally generated noise. InSb detectors cannot operate effectively above about 145 K, and are seldom used above 100 K. Within the past decade HgCdTe and InAsSb photoconductive and photodiode technology has matured in the MWIR spectral band so that operation at 180 K, using thermoelectric coolers as well as mechanical coolers at 120 K, has been possible. The spectral response of thermoelectric cooled HgCdTe detector has a cutoff of 5 $\mu$m at 180 K.

State-of-the-art performance is often desired in the realm of infrared radiation detection; in general; in order to be optimal, infrared radiation detection requires use of very high quality material. InSb and HgCdTe are both very mature for use in the NWIR spectral region. InSb is an equally sensitive alternative to HgCdTe for MWIR applications. InSb is easier to produce at high quality than HgCdTe, and has found a niche in the marketplace as a cost-effective alternative for high-sensitivity MWIR applications that require good, corrected uniformity. See, e.g., J. L. Miller, *Principles of Infrared Technology—A Practical Guide to the State-of-the-Art*, Van Nostrand Reinhold, John Wiley & Sons, Inc., New York, 1994, incorporated herein by reference; see, especially, pages 370–431.

The availability of photovoltaic HgCdTe and InSb infrared image detectors continues to expand rapidly as the technology has matured and entered a transition to production for both commercial and military applications. Detector costs for staring array formats, however, continue to limit the market demand. Although a seeker containing these arrays represents a small percentage of the weight of a missile system, it represents a large percentage of the cost—up to 50% or more; see, e.g., aforementioned book by J. L. Miller entitled *Principles of Infrared Technology—A Practical Guide to the State-of-the-Art*. Although a missile seeker could, therefore, conceivably be produced for only tens of thousands of dollars, in reality missile seeker development is still expensive and can run from tens to hundreds of millions of dollars.

SUMMARY OF THE INVENTION

In view of the foregoing, it is an object of the present invention to provide method and apparatus for effectuating midwavelength infrared radiation photon detection.

It is another object of the present invention to provide a high caliber composition for optimally effectuating midwavelength infrared (MWIR) radiation photon detection.

It is a further object of this invention to provide apparatus, including such high caliber composition, for optimally effectuating midwavelength infrared radiation photon detection.

It is another object of this invention to effectuate midwavelength infrared radiation detection at relatively high temperatures (e.g., room temperature), so that such detection does not require cooling or only requires relatively moderate cooling.

A further object of this invention is to effectuate mid-wavelength infrared radiation photon detection of both polarized and unpolarized radiation.

Another object of this invention is to effectuate midwavelength infrared radiation photon detection efficiently and economically.

According to many embodiments of the present invention, these objects are achieved by providing fibers of Niobium Trisulfide ($NbS_3$) and an insulative substrate. The $NbS_3$ fibers form a single layer of approximately parallel sensing segments resting on an electrically insulating quartz (or other insulating material) substrate. According to some embodiments of this invention, an assembly includes $NbS_3$ fibers (along with their corresponding insulative substrates) which are arranged in four types of fiber orientations (viz., 0 degrees, 45 degrees, 90 degrees and 135 degrees) as part of an extended focal plane array; this inventive assembly permits the detection of polarized and unpolarized infrared light (radiation); that is, the array permits infrared detection of plural polarizations of infrared radiation.

The present invention provides an infrared electro-optic charge-density-wave conducting material, viz., Niobium Trisulfide ($NbS_3$), in crystalline fibrous form, for use in association with midwavelength infrared radiation photon detection. The present invention also provides a device for infrared radiation detection, the device comprising $NbS_3$ and a substrate. For use in association with photon detection of midwavelength infrared radiation, the inventive combination includes an approximately parallel, fibrous configuration of $NbS_3$ situated atop an insulative (nonconductive) substrate. According to typical such inventive embodiments, charge-density-wave fibers of $NbS_3$ are provided for an uncooled detector in the 3–5 µm infrared wavelength range.

This invention provides a midwavelength infrared radiation photon detector and a methodology for midwavelength infrared radiation photon detection. A typical infrared detector according to this invention comprises the combination of plural Niobium Trisulfide crystalline fibers and an insulative substrate. The insulative substrate has an approximately flat substrative surface. The Niobium Trisulfide fibers are adjoinedly disposed in approximately parallel fashion on the substrative surface. The detector is positionable relative to incident infrared radiation so that the substrative surface is approximately orthogonally facing the incident infrared radiation. A typical infrared detection method according to this invention comprises positioning such an inventive device relative to incident infrared radiation so that the substrative surface is approximately orthogonally facing the incident infrared radiation.

According to many inventive embodiments, an uncooled polarized radiation photon detector is intended for utilization in focal plane arrays for the purpose of sensing polarized thermal emissions. Frequently according to such embodiments, this invention provides a detector with thin fibers of $NbS_3$ lying in parallel on a rectangular noninsulative (e.g., quartz) substrate, and with thin strips of electrically conductive metallic (e.g. tin) films coupling the fibers to leads for connection to external circuitry.

According to many embodiments of the present invention, the inventive midwavelength infrared detector includes pregrown parallel thin, flat, narrow crystalline fibers of $NbS_3$ charge-density-wave conductors resting flatwise on a rectangular quartz substrate on which thin strips of evaporated tin films electrically couple the ends of the fibers to leads for connection to external circuitry. The inventive $NbS_3$ electrical conductors have an energy gap of about 0.3 eV for temperatures below 355 K, enabling sensing in the 3–5 µm wavelength range. The flat fibers sense the radiation of an emitting object through the excitation of unpaired charge carriers by means of infrared photons breaking up paired charges. The inventors have made a prototypical embodiment of the present invention's infrared detector which demonstrates the efficacy thereof.

The present invention can be used individually to detect the presence of infrared radiation, or can be used in arrays to provide additional information such as spatial resolution (e.g., for an imager or spectrometer). The inventive arrays can include like or unlike inventive detectors. A particularly noteworthy latter kind of inventive array comprises plural detectors characterized by varying $NbS_3$ fiber orientations. In this regard, a preferred embodiment of the present invention provides a combination of plural midwavelength infrared detectors, such combination including at least one set of four detectors, wherein the detectors of a given set have parallel fibers oriented at 0°, 45°, 90° and 135° for use in a focal plane array. In other words, the combination of plural detectors includes: at least one square region having fibers oriented at 0°; at least one square region having fibers oriented at 45°; at least one square region having fibers oriented at 90°; and, at least one square region having fibers oriented at 135°. According to many such inventive embodiments, a plurality of the inventive uncooled detectors, including at least one set of four of the inventive uncooled detectors wherein the parallel fibers are oriented at the four different orientations (0 degrees, 45 degrees, 90 degrees and 135 degrees), enables the development of a focal plane array for detection not only of polarized infrared radiation, but also of unpolarized infrared radiation. Such arrays may be used in lightweight weapon seekers which are suitable for advanced target recognition, decoy discrimination and clutter rejection.

By way of explanation, normally the waves of a beam (ray) of radiation (light) are disorderly; that is, although each wave vibrates in a direction perpendicular to its path, there is no favored orientation or direction of such vibrations. Such light beams are referred to as "unpolarized." However, when all of the waves in a light beam vibrate in parallel planes and in the same perpendicular direction, such light beams are referred to as "polarized" (e.g., "linearly polarized," as distinguished from "circularly polarized" or "elliptically polarized"). These well-known scientific principles concerning polarized and unpolarized electromagnetic radiation are applicable to the present invention. A single inventive infrared detector will normally be photosensitive only to those components of infrared radiation beams which are polarized in comportment with the particular configuration of its parallel Niobium Trisulfide fibers; in other words, that detector will sense only the portions of the infrared radiation which are polarized insofar as being characterized by waves which vibrate in planes which are parallel to each other and in identical perpendicular directions which are parallel to the parallelly arranged Niobium Trisulfide fibers. On the other hand, an array of infrared detectors according to this invention will include at least four detectors corresponding to at least four orientations of the parallelly distributed Niobium Trisulfide fibers. Each detector of the array will be photosensitive to infrared radiation which is polarized in agreement with the Niobium Trisulfide fiber parallelness specific thereto. However, with the assistance of apparatus such as including a processor, information can be obtained according to this invention as to other, "in-between" directions of infrared waves, based on infrared wave data pertaining to the actual fibrous orientations. In fact, a complete or nearly complete representation of the "unpolarized" infrared light beam can be achieved in accordance with inventive practice of detector arrays.

Advantageously, the present invention can afford moderately cooled or uncooled infrared detection. The present invention succeeds in reducing or eliminating the requirement of cooling. Hence, infrared seeker packaging will be more lightweight and compact with lower power consumption. Furthermore, seeker packaging according to this invention will be much less costly, because $NbS_3$—a detector material other than a semiconductor material—is implemented. Moreover, system reliability will be improved.

The present invention features, inter alia, the nonsemiconducting charge-density-wave crystalline fibrous material $NbS_3$, which possesses an energy gap of about 0.3 eV for temperatures below 355 K. Although the crystalline fibrous material $NbS_3$ is known generally, it has never been used or known to be useful in any infrared detection applications. In the context of any manner of infrared radiation detection (including but not limited to midwavelength infrared radiation detection), the present invention's mere use of $NbS_3$ in any photosensitive capacity (e.g., as a photoconductive material), in and of itself, represents a significant, unique and previously unknown improvement in the art. The energy gap in InSb is smaller at 0.18 eV at 300 K, whereas the gap can be tailored in the ternary alloys HgCdTe and InAsSb for use at longer wavelengths. The much more robust energy gap in $NbS_3$ greatly reduces the dark current noise, which rapidly increases above 80 K in the semiconductors, making the semiconductor materials practically useless for IR detection much above 80 K.

HgCdTe, InAsSb and InSb can detect through either of two processes, viz., the photoconductive semiconductor mode of varying conduction with illumination intensity, or the photovoltaic (photodiode) mode wherein the voltage across the detector is generated from the incident radiation. In the photoconductive mode, these detectors are characterized by moderate to high detectivity and relatively low frequency response. On the other hand, similar photoexcitation properties, but faster response times are observed in thin-film high temperature superconductors; see R. Sobolewski, "Ultrafast Dynamics of Nonequilibrium Quasiparticles in High Temperature Superconductors," in *Proceedings of SPIE*, Vol. 3481, Jul. 20–24, 1998, pp 480–491, incorporated herein by reference. These superconducting materials are being considered for detection, since their critical temperatures $T_C>90$ K exceed the best temperatures for cooling of InSb and HgCdTe.

Other studies of these superconducting materials have indicated, however, that the photoeffect must occur at lower temperatures in the 10 K–30 K range; see M. G. Forrester and J. Talvacchio, "Photon Detection by High Temperature Superconducting Films: Fundamental Limits," *Physica C*, Vol. 162–164, pp 391–392 (1989), incorporated herein by reference. At higher temperatures, the generation-recombination (g-r) noise would limit the detectors. That is, in the absence of incident radiation, there would be an equilibrium density of quasiparticles due to thermal excitation. Fluctuations in their generation rate from breakup of Cooper pairs, and their recombination into Cooper pairs, would constitute noise in the readout.

Generally speaking, charge density wave (CDW) materials are analogous to superconductive materials, particularly insofar as being characterized by a kind of "condensation" effect wherein under certain circumstances electrons tend to behave collectively (but do not behave so in the presence of a magnetic field). In this regard, the charge density wave material $NbS_3$ has certain properties similar to those of superconductors. In the CDW material $NbS_3$, the much larger energy gap of 0.3 eV leads to a much smaller thermal generation rate and a lower g-r noise level. In fact, the g-r noise for $NbS_3$ is smaller than the level in any of the semiconductors with smaller energy gaps of <0.22 eV. Thus, since the spectral detectivity or specific sensitivity is inversely proportional to the square root of the g-r noise, $NbS_3$ is the superior material of choice, even at temperatures colder than 300 K.

$NbS_3$ is only one member of a series of CDW materials. See the following references, each of which is incorporated herein by reference: P. J. Sarman, R. D. Bardo and R. Chen, "Charge Density Wave Materials," in *FY98 NSWC Carderock Division Research Digest*, Naval Surface Warfare Center, Carderock Division, CARDEROCKDIV-99/CT01, Mar. 1999, pp 73–75; P. J. Sarman, R. D. Bardo and R. Chen, "Charge Density Wave Materials," in *FY99 NSWC Carderock Division Research Digest*, Naval Sea Systems Command, Naval Surface Warfare Center, Carderock Division, CARDEROCKDIV-00/CT01, March 2000, pp 48–50. Also notable is R. D. Bardo, P. Sarman and R. E. Thorne, "Infrared (2.5 $\mu$m to 13.5 $\mu$m) Reflectance Measurements and Calculations of the Peierls Gap Energy in $NbSe_3$," accepted for publication in *Phys. Rev. B.* Nevertheless, $NbS_3$ has, by far, the highest critical temperature of 355 K.

Figure 1:
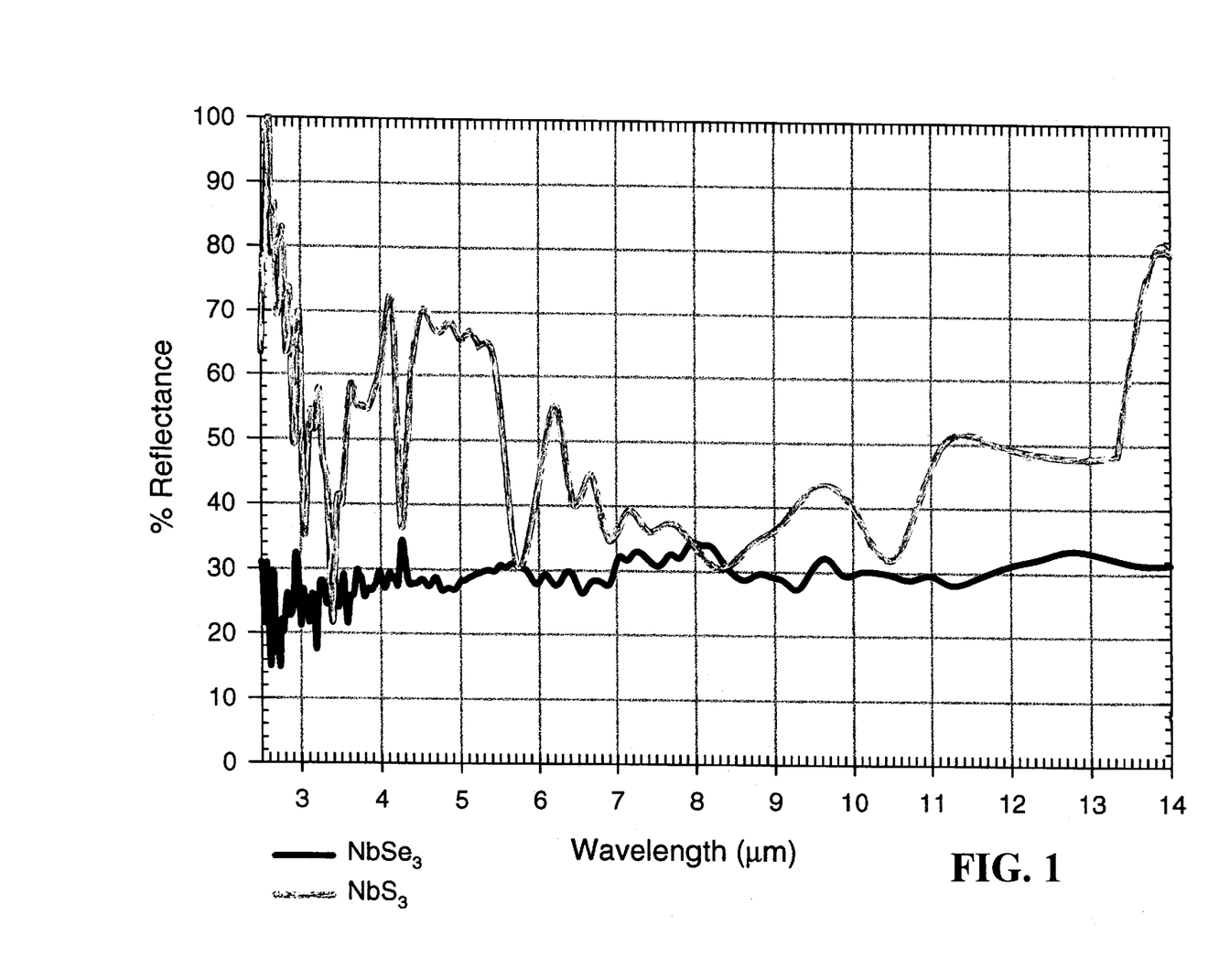
FIG. 1 is a graphical representation, in terms of percentage reflectance versus wavelength ($\mu$m), of a reflectance comparison between Niobium Trisulfide ($NbS_3$) and Niobium Triselenide ($NbSe_3$).

Moreover, single, high-quality fibrous $NbS_3$ crystals are easily and inexpensively grown in a three-zone infrared furnace at temperatures of 650° C. $NbS_3$ crystals of any length up to 1 cm may be routinely grown, enabling the design of detectors up to 1 $cm^2$. As illustrated in FIG. 1 herein, the reflectance measurements performed by the present inventors (also the authors of the aforementioned articles by Sarman and Bardo, each article entitled "Charge Density Wave Martials") on these $NbS_3$ crystals confirm their high quality and the existence of the energy gap in the 3–5 $\mu$m wavelength range.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Referring now to FIG. 1, the reflectance spectra of two charge density wave (CDW) conductors, viz., $NbS_3$ ($T_C$=355 K) and $NbSe_3$ ($T_C$=145 K), were compared by the joint inventors; see aforementioned articles by Sarman et al. each entitled "Charge Density Wave Materials." The $NbS_3$ crystals were newly grown by the joint inventors in an infrared furnace; the $NbSe_3$ crystals were previously grown. The joint inventors performed infrared reflectance measurements on the $NbS_3$ crystals and the $NbSe_3$ crystals.

As distinguished from $NbSe_3$, the Peierls energy gap (2Δ) for $NbS_3$ exists at 300 K, resulting in the much higher room temperature reflectance of about 70 percent near wavelength λ=4.1 μm. Unfortunately, the presence of a strong absorption for $CO_2$ at 4.3 μm prevents a precise determination of 2Δ, although at 4.1 μm, 2Δ=0.3 eV. This value and the calculated value of $2Δ/k_B T_C$=10 gives critical temperature $T_C$=348 K, which is close to the accepted value of 355 K obtained by other researchers. To the present inventors, these results suggested the possible usefulness of good crystals of $NbS_3$ which can be readily grown and produced in quantity.

Figure 2:
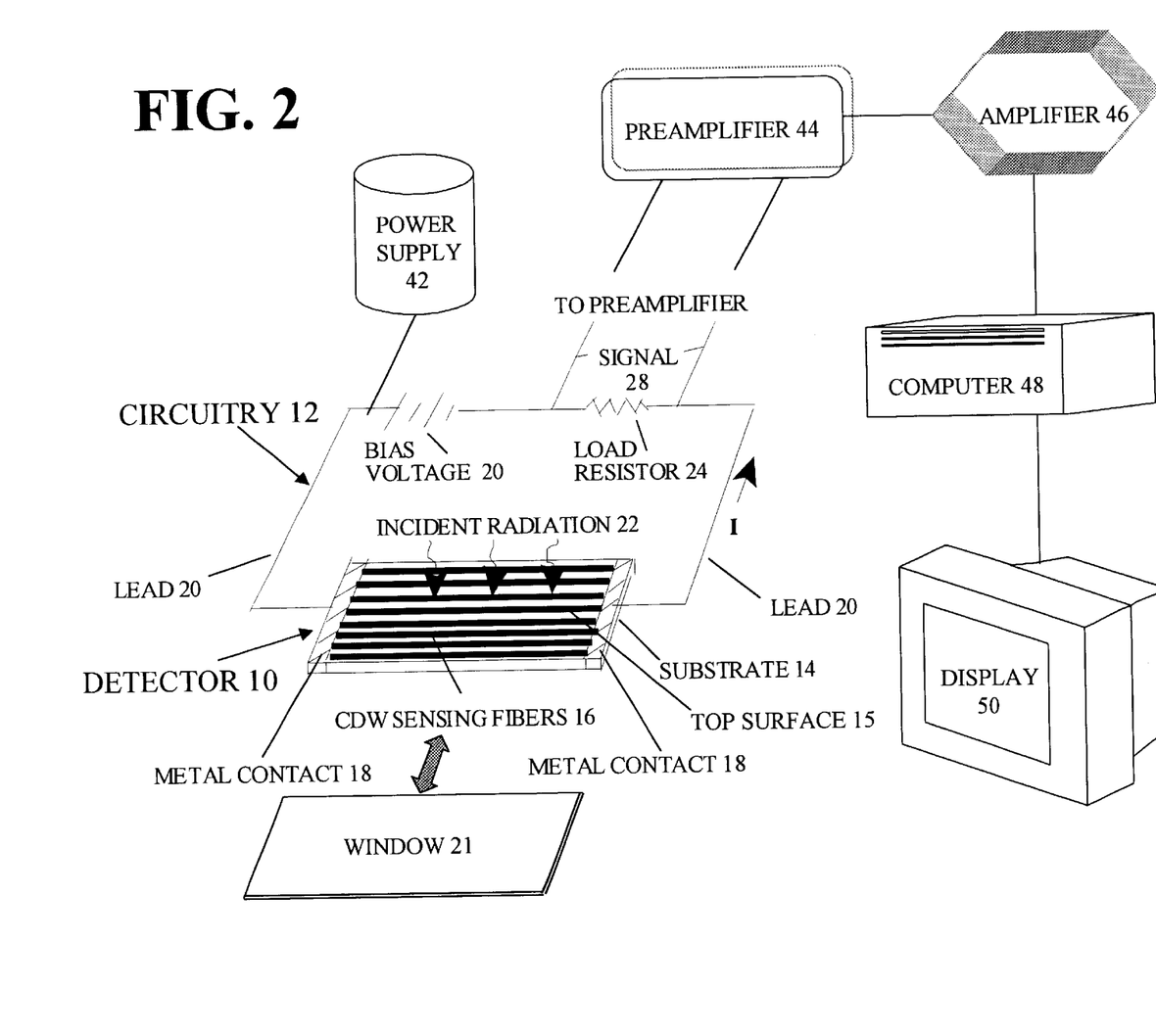
FIG. 2 is a schematic diagram of an embodiment of an infrared detection system in accordance with the present invention. Especially shown is a diagrammatic perspective view of the transverse geometry of an embodiment of an uncooled $NbS_3$ CDW fiber detector in accordance with the present invention. Also illustrated, inter alia, are an external circuit and leads, wherein the leads connect the inventive detector to the external circuit.

Reference is now made to FIG. 2, which shows the overall arrangement of the inventive charge density wave (CDW) infrared detector 10 and the required external circuit 12. Inventive infrared detector 10 includes insulative substrate 14 and $NbS_3$ crystal fibers 16. The insulative substrate 14 is made of an electrically nonconductive (insulative) material such as quartz, corundum, germanium, glass, plastic, ceramic (e.g., porcelain) or composite. Because of its usually robust quality, a material such as quartz may be a preferred composition for substrate 14, which can be opaque, translucent or transparent. Substrate 14, at least substantially flat or planar and of arbitrary thickness, supports the discretely and approximately coplanarly arranged CDW fibers 16.

In terms of functionality, it is critical to this invention that the fibers 16 be arranged discretely and approximately parallelly with respect to each other. In order to sustain fibers 16 in this manner, a substrate 14 (upon which the fibers 16 are laid) is a preferred component of the housing means for holding fibers 16 in place. Fibers 16 will typically be rather frangible; because of their fragility, use of a substrate 16 will generally represent the most practical inventive technique for holding or helping to hold fibers 16 in position. The protectiveness of the housing may be especially important if, in application, inventive device 10 is expected to be subjected to strong external forces such as the "g"-forces associated with rocketry.

According to typical inventive practice, each of the fibers 16 is up to 1 cm in length, 50–100 μm (microns) in width, and 5–10 μm in thickness; nevertheless, smaller or larger dimensions of fibers 16 are possible in accordance with inventive principles. In view of the wavelengths characterizing MWIR radiation, fiber 16 lengths of 1 cm or less will normally suffice for inventive practice. Generally, the width of a fiber 16 will be roughly ten times its thickness. CDW fibers 16 are flat, or tape-like, or at least substantially so. Each $NbS_3$ crystal fiber 16 essentially represents a single or integral strand of crystalline $NbS_3$. A cross-sectional view of a representative $NbS_3$ fiber 16 would reveal a basically rectangular peripheral shape, with surface irregularities perhaps on the order of one micron (1 μm) or less in height.

As pertains to a particular inventive detector 10, neither spacing of the fibers 16, nor exact parallel alignment of the fibers 16, is critical to inventive practice. The fibers 16 can be spaced equidistantly (uniformly) or nonequidistantly (nonuniformly). The fibers 16 can be spaced relatively closely or relative distantly, or some combination thereof. Nor is it important whether the fibers 16 are of uniform thickness within a given detector 10. However, regardless of the spacing therebetween in a given detector 10, it is critical that the fibers 16 not touch each other. In particular, the fibers 16 must be distributed in a physically separated manner with respect to each other, in order that they be distributed in an electrically separated manner with respect to each other; that is, in an electrical sense, each fiber 16 must be insulated or isolated from every other fiber 16. Furthermore, it is critical that each $NbS_3$ fiber 16, at both ends thereof, touch the highly conductive contacts 18.

Moreover, the number of fibers 16 in a particular infrared detector 10 may be an important consideration in practicing this invention. A good inventive "rule of thumb" is that there should be at least ten fibers per $cm^2$ of substrate 14 area, such as described by a 1 cm by 1 cm substrate 14. Since the $NbS_3$ crystal fibers 16 will generally be characterized by surface defects (irregularities, peaks and valleys, or a "hilly terrain"), a greater number of fibers 16 will better serve to average out such anomalies associated with the shapes of fibers 16. Such anomalies in the fiber 16 shape may have decreasing significance with increasing infrared wavelength. In the light of this disclosure, it will be apparent to the ordinarily skilled artisan that detector 10 can be inventively practiced using any of diverse configurations, in terms of dimensions and distances, of the fibers 16 encompassed by a detector 10.

The pre-grown $NbS_3$ crystal fibers 16 can be placed upon (e.g., singly laid down on top of) the substrate 14 with their flat surfaces parallel to the planar top (upper) surface 15 of substrate 14. Fibers 16 are contiguous with (e.g., resting upon) top surface 15 of substrate 14, fibers 16 thereby describing an imaginary plane which is closely parallel to top surface 15. Evaporation of tin (or perhaps preferably another, even more highly electrically conductive metal material such as copper, aluminum, gold, silver or chromium) onto the ends or extremities of the fibers 16 can form the metallic contacts 18, which bondingly secure the fibers 16 and lead wires 20 to the substrate 14. A flat transparent sapphire window 21 can be sandwiched onto the $NbS_3$ crystal fibers 16 and high conductivity contacts 18 for protection. Window 21 is next to or adjacent to substrative surface 15 so as to contact or be proximate fibers 16, fibers 16 thereby being situated between substrative surface 15 and window 21. Window 21 is made of a material which is both electrically nonconductive and transparent to infrared radiation, such as quartz, diamond (film), germanium, glass, plastic (e.g., polyethylene), ceramic or composite; material such as germanium or polyethylene may be preferable as having superior transparency characteristics as pertains to infrared radiation. Metallic contacts 18 can also be used for their adhering effect to secure window 21 to substrate 14. There are various ways of coupling the fibers 16, lead wires 20 and window 21 with the substrate 14.

For instance, an adhesive (e.g., glue) can be used for adhering fibers 16, lead wires 20 and/or window 21 to the substrate 14. As another example, solid metallic contacts 18 can be attached to substrate 14 so as to be situated over the ends or extremities of fibers 16, thereby holding fibers 16 in position. As a further alternative, metallic contacts 18 can be provided in to the form of indium film which is disposed upon substrate 14 and over the ends or extremities of fibers 16. The perimeter of substrate 14 can be provided with slots for engagement with the ends or extremities of fibers 16. Window 21 can be congruent or coextensive with substrate 14, or can be slightly shorter than substrate 14 so as to be compatibly situated between metallic contacts 18; window 21 can serve merely as a transparent protective covering, or can serve the additional purpose or purposes of holding down fibers 16 and/or securing fibers 16 with respect to substrate 14. In the light of this disclosure, various other approaches to coupling fibers 16, lead wires 20 and window 21 with substrate 14 will be apparent to the ordinarily skilled artisan. For instance, for such purposes, fastening means such as that which includes clamps, clasps, screws, bolts, etc. can be implemented according to this invention, but preferably in such a way as to minimize weight.

Lead wires 20 connect inventive detector 10 to the external electronic circuitry 12. According to typical inventive embodiments, circuitry 12 will be situated behind substrate 14 (i.e., below the imaginary plane defined by substrate 14). Since the inventive CDW detector 10 photoresponse is similar to that relating to photoconductor detection, the associated circuitry 12 is also similar. The incident radiation 22 may be perpendicular to the direction in which the current is measured.

The present invention can operate in photoconductive mode (such as described herein with reference to FIG. 2) or photovoltaic (photodiode) mode. That is, detection of the photosignal 28 (the increase in current when detector 10 is exposed to infrared radiation) will be made by observation of a change in either current, or voltage, developed across the load resistor 24 in series with the inventive infrared detector 10. In accordance with most embodiments of the present invention, practice in photoconductive mode (such as described herein with reference to FIG. 2) will be preferred instead of practice in photovoltaic mode; this is so not only because the state of the art in general seems to be such that photoconductive detectors are favored over photovoltaic detectors, but also because, specifically as regards the present invention, the Niobium Trisulfide fibrous crystals seem to be more conducive to, or lend themselves more effectively to, practice in photoconductive mode. Nevertheless, in the light of this disclosure, the ordinarily skilled artisan will be capable of practicing the present invention in either photoconductive mode or photovoltaic mode. For instance, effectuation of photovoltaic mode would be illustrated similarly as illustrated in FIG. 2 (which pertains to photoconductive mode), with at least one notable difference involving utilization of a kind of voltmeter means or photodiode means (instead of a voltage biasing means 20) which is connected to power supply 42.

When the load resistance greatly exceeds the detector resistance $R_d$, the observed photovoltage change $\Delta V_L$ across the load is essentially the open circuit value, $\Delta V_L = I\ R_d$, where I is the increase in current above the "dark current" caused by the ever-present thermal excitation of quasiparticle charges. Generation of current I, which is proportional to the photo-excited charges, involves the application of a bias voltage 26 (the source of which is power supply 42) across inventive detector 10. This voltage must be on the order of 0.1 to 0.2 eV, which are less than the gap energy of 0.3 eV for $NbS_3$. These values will convert the conductivity modulation to an electrical signal 28 voltage or current.

A typical infrared detection system 40 according to this invention includes infrared detector 10, external circuitry 12 and other components. In inventive practice, a power supply 42 will usually be required to be in connection with circuitry 12. Furthermore, according to conventional infrared detection practice, there are certain known apparatuses and techniques which are utilized for processing an electrical signal (or photosignal) which is produced or given forth by an infrared detector and its associated circuitry. Typical embodiments of the present invention will implement similar apparatuses and techniques. For example, still referring to FIG. 2, generally according to this invention, a preamplifier (also referred to as a preliminary amplifier) 44 will be used for extracting the useful signals 28 from detector 10 and its accompanying circuitry 12. Basically, preamplifier 44 is an amplifier which serves to boost or synchronize the signal 28 output so that signal 28 can be further processed, and to do so without significant degradation of the signal-to-noise ratio of infrared detection system 40. Preamplifier 44 receives a (typically low level) signal 28 and amplifies it so that it can become the input for additional amplifier circuitry such as depicted by amplifier 46. At some point, a total output signal 28 received from amplifier circuitry (such as depicted in FIG. 2 by amplifier 46) is processed by computer processing means (such as depicted in FIG. 2 by computer 48). Then, the information from computer 48 is comprehensibly displayed visually on a monitor or other device, such as depicted in FIG. 2 by display 50.

Figure 3:
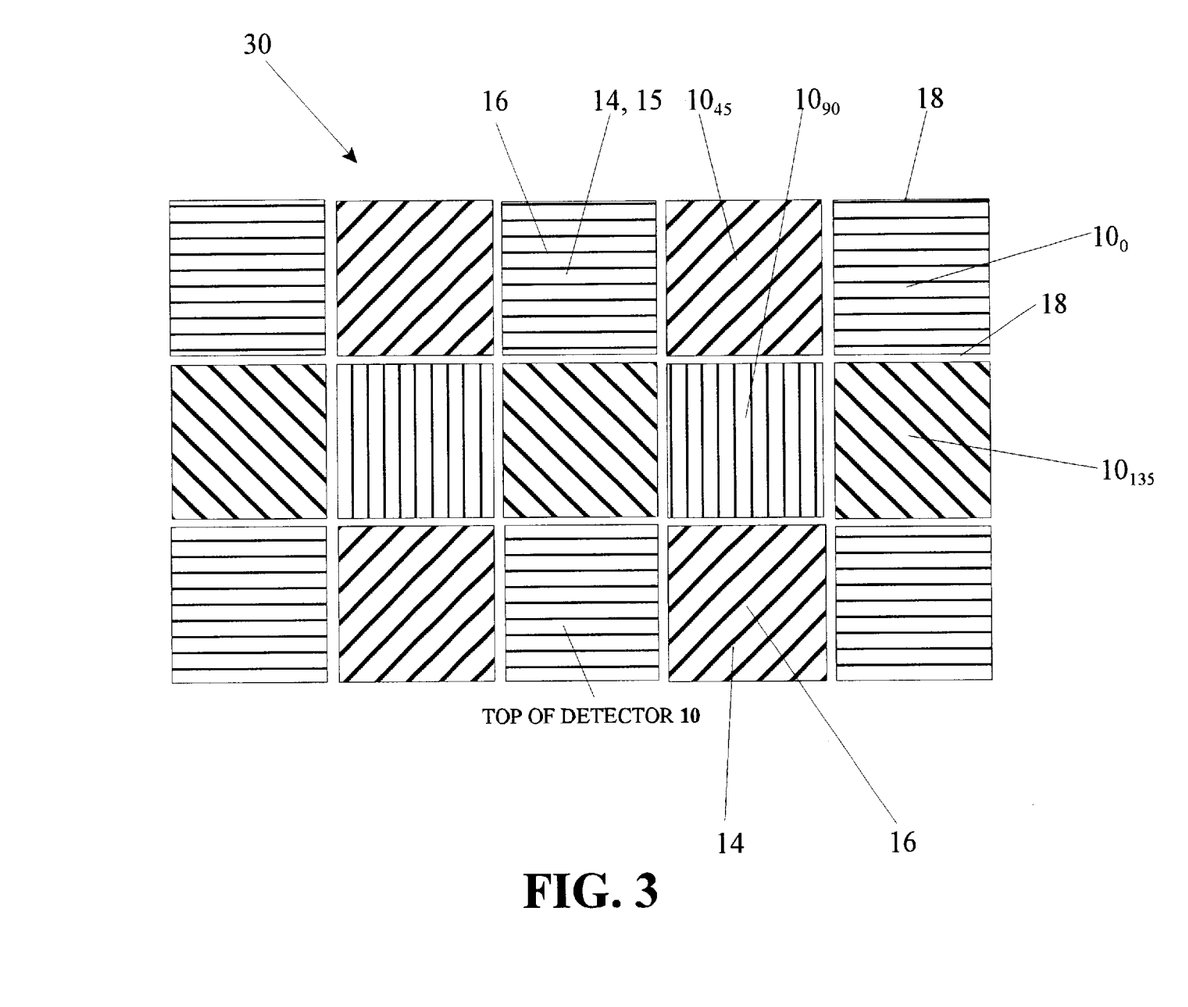
FIG. 3, FIG. 4 and FIG. 5 are each a diagrammatic top plan view of an embodiment of a focal plane array in accordance with the present invention, each rectangle of the focal plane representing an inventive detector such as shown in FIG. 2. The focal plane array of rectangular detectors includes four orientational kinds of detectors having fibers oriented at 0°, 45°, 90° and 135°, respectively.
Figure 4:
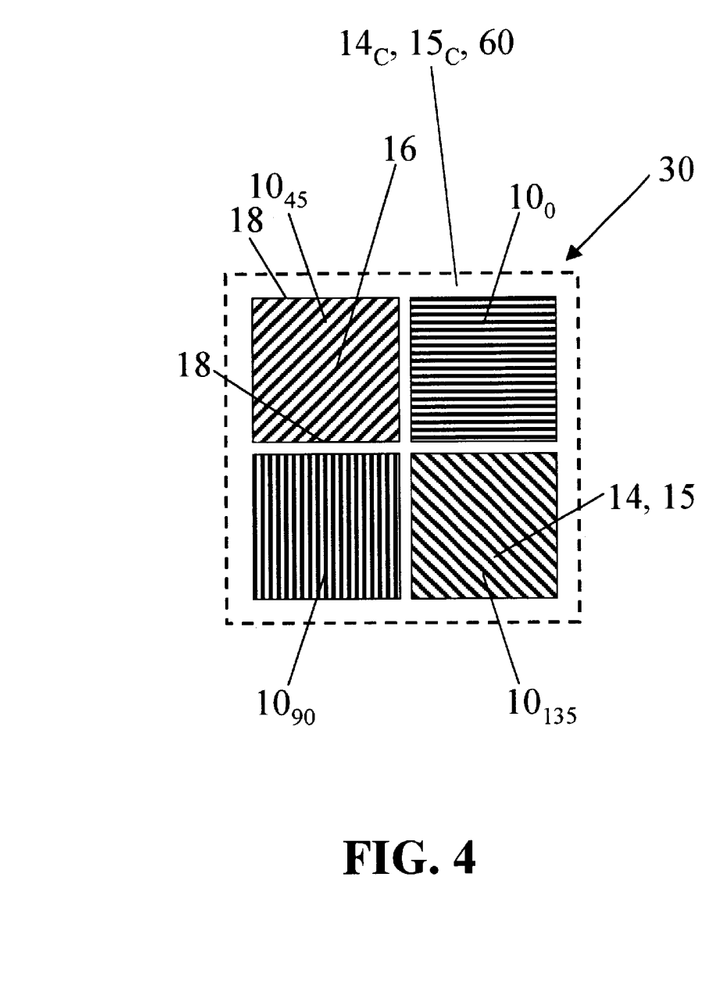
Figure 5:
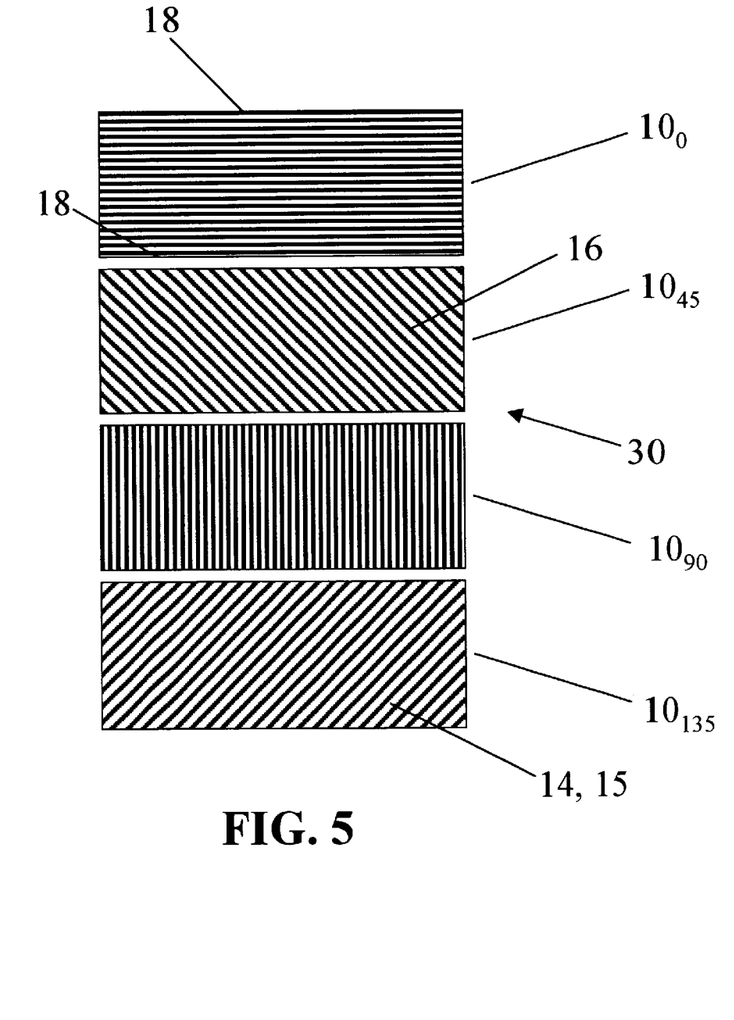

With reference to FIG. 3 through FIG. 5, the parallel fibers 16 of $NbS_3$ are oriented at a 0° angle, a 45° angle, a 90° angle and a 135° angle, relative to the substrate 14 parallel edges 18, to form four basic orientational types of inventive detectors 10, viz., detector $10_0$, detector $10_{45}$, detector $10_{90}$ and detector $10_{135}$, respectively. In each detector 10, the fibers 16 are non-touching (electrically separate) vis-a-vis' each other. The fibers 16 for each of detectors $10_0$ and $10_{90}$ are about equal in length, while the fibers 16 for each of detectors $10_{45}$ and $10_{135}$ vary in length. Each detector 10 is rectangular in shape and is individually "wired," having associated therewith its own external circuitry 12 (not shown in FIG. 3 through FIG. 5) such as shown in FIG. 2. Also, each detector 10 in array 30 will typically have associated therewith its own preamplification means and amplification means such as preamplifier 44 and amplifier 46, respectively, shown in FIG. 2. However, it may be preferable that a single data acquisition and processing unit—such as including a single processing means (e.g., computer 48 shown in FIG. 2) and a single display means (e.g., display 50 shown in FIG. 2)—be used in association with array 30.

For each detector 10, the corresponding circuitry 12 will normally be below plane (i.e., below the imaginary plane defined by the detector's substrate). These detectors $10_0$, $10_{45}$, $10_{90}$ and $10_{135}$, respectively characterized by the four various (forty-five degree incremental) orientations of fibers 16, are then assembled into the complete focal plane array 30 for polarized and unpolarized radiation detection and discrimination. In other words, a single detector 10 will be adapted or adaptable to sensing infrared radiation characterized by a single polarization; in contrast, an array 30 of detectors 10 will be adapted or adaptable to sensing infrared radiation characterized by plural polarizations. Such array 30 collections of the four orientational types of detector 10 elements will be inventively practicable, on an individual detector 10 basis, in accordance with the basic architecture and bias control such as illustrated in FIG. 2.

In order to constitute a complete inventive array 30, it is necessary to include at least one detector 10 of each fiber 16 orientational type in a given array 30's multi-orientational scheme. For instance, an array 30 characterized by four different fiber 16 orientations, in forty-five degree increments, should have at least one zero-degree detector $10_0$, at least one forty-five degree detector $10_{45}$, at least one ninety-degree detector $10_{90}$ and at least one one-hundred-thirty-five-degree detector $10_{135}$. FIG. 4 and FIG. 5 exemplify two possible inventive array 30 configurations having the minimum four detectors 10. FIG. 3 exemplifies a possible inventive array 30 having more than four detectors 10 (To be exact, fifteen detectors 10 are shown in FIG. 3). Although the performance of array 30 would, in general, tend to improve with increasing numbers of detectors 10, such benefit may be counterbalanced against the greater costs and complexities associated with greater numbers of detectors 10. Diverse array 30 arrangements, in terms of rows and columns of detectors 10, are possible in inventive practice—such as comparatively demonstrated by the two-by-two four-detector arrangement of FIG. 4 and the one-by-four four-detector arrangement of FIG. 5.

As shown in FIG. 3 through FIG. 5, each detector 10 has an approximately rectangular shape. Whether used singly or in combination with other detectors 10 in an array 30, diverse detector 10 shapes are possible consistent with inventive principles; nevertheless, from a practicality (e.g., economic) standpoint, in the vast majority of inventive applications it will be preferred that the detector or detectors 10 be rectangularly shaped. A square detector 10 shape is depicted in FIG. 3 and FIG. 4. A non-square rectangular detector 10 shape is depicted in FIG. 5. When used in the context of array 30, a square rectangular detector 10 shape, vis-a-vis' a non-square rectangular shape, may be advantageous in terms of the overall manufacturing costs associated with array 30.

In accordance with the present invention, detector 10 sizes of 5 $\mu$m or larger and array 30 sizes of 1024×1024 may ultimately be feasible with grown crystals 16 of 5 $\mu$m or greater lengths. However, such a large array 30 would primarily serve the purpose of employing a large field of view, which usually is not necessary with a seeker unless it is performing additional functions such as surveillance. Within a given array 30, it is generally preferable (but not necessary) that every detector 10 in such array 30 be characterized by about the same size and shape.

Within a given array 30, it is essential that the fibers 16 be variously oriented among the plural detectors 10; however, in terms of each detector 10 as compared to the others, it is not important whether the fibers 16 be similar (equivalent) or dissimilar (nonequivalent) in terms of number, spacing or fiber 16 thickness. Usually, in inventive practice, the minimum orientational requirement is that at least a first detector 10 have a fiber 16 orientation which can be considered to be zero degrees, at least a second detector 10 have a fiber 16 orientation which can be considered to be forty-five degrees, at least a third detector 10 have a fiber 16 orientation which can be considered to be ninety degrees, and at least a fourth detector 10 have a fiber 16 orientation which can be considered to be one hundred thirty-five degrees. Although it is inventively possible to provide an array 30 having just two-detectors 10 (e.g., in ninety degree orientational increments) or just three detectors 10 (e.g., in sixty degree orientational increments), it is generally preferred inventive practice to provide an array 30 having at least four detectors 10 (e.g., in forty-five degree orientational increments). Four is the preferred number of detectors 10 for many embodiments of array 30. Providing more than four detectors 10 may afford additional benefits, but may not be worth the additional costs in view of the great precision which can be achieved using computer processing in association with an array 30 having four detectors 10.

Some inventive embodiments may provide more than four fiber 16 orientations. For example, an inventive array 30 can include at least eight detectors 10, wherein: at least a first detector 10 has a fiber 16 orientation of 0 degrees; at least a second detector 10 has a fiber 16 orientation of 22.5 degrees; at least a third detector 10 has a fiber 16 orientation of 45 degrees; at least a fourth detector has a fiber orientation of 67.5 degrees; at least a fifth detector has 10 has a fiber 16 orientation of 90 degrees; at least a sixth detector 10 has a fiber 16 orientation of 112.5 degrees; at least a seventh detector 10 has a fiber 16 orientation of 135 degrees; and, at least an eighth detector 10 has a fiber 16 orientation of 157.5 degrees. In the light of this disclosure, it will be apparent to the ordinarily skilled artisan that inventive practice of array 30 lends itself to any of multifarious numbers, orientations, shapes, configurations, sizes and/or arrangements of the detectors 10 within an array 30, and of the array 30 itself.

An inventive array 30 typically comprises at least two inventive devices 10 such that the corresponding substrates 14 are generally adjacent to each other, and their respective substrative surfaces 15 approximately lie in the same geometric plane. The devices 10 can be integrated into a single array 30 unit in any of various ways. In the light of this disclosure, various techniques for constructing an array 30 of devices 10 will be apparent to the ordinarily skilled artisan. According to frequent inventive practice, each device 10 will include it own fibers 16 and substrate 14, and the separate devices 10 will be united to form a single array 30 unit. To such end, for instance, the individual substrates 14 can be joined with each other, and/or can each be coupled with a foundational or base structure 60, such as shown in FIG. 4. According to less typical inventive practice, the plural devices 10 will share the same comprehensive substrate $14_C$ having a comprehensive substrative surface $15_C$, such as shown in FIG. 4, whereby each substrate 14 (each of which has its own substrative surface 15) represents a portion or section of comprehensive substrate $14_C$; comprehensive substrate $14_C$ can be included in, incorporated into or essentially function as a foundational/base structure 60, as well.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Apparatus for detecting infrared radiation, said apparatus comprising plural Niobium Trisulfide crystalline fibers and a housing, said fibers being for sensing said infrared radiation, said housing being for maintaining said fibers in approximately parallel disposition, wherein said apparatus is for detecting midwavelength infrared radiation.

2. Apparatus for detecting as recited in claim 1, wherein each said fiber is characterized by:

a generally flat shape;

a length no more than about 1 cm in length;

a width in the range between about 50 $\mu$m and about 100 $\mu$m; and a thickness in the range between about 5 $\mu$m and about 10 $\mu$m.

3. Apparatus for detecting as recited in claim 1, wherein said housing includes a substrate which is at least substantially made of an electrically nonconductive material, and wherein said fibers are situated upon said substrate so as to be at least slightly spaced apart.

4. Apparatus for detecting as recited in claim 3, wherein said apparatus comprises an array of plural said substrates, each said substrate being associated with plural said fibers so that said fibers are situated upon said substrate so as to be at least slightly spaced apart, wherein at least a first said substrate is associated with plural said fibers which are approximately parallelly oriented in a generally first direction, and wherein at least a second said substrate is associated with plural said fibers which are approximately parallelly oriented in a generally second direction which differs from said generally first direction.

5. Apparatus for detecting as recited in claim 3 wherein said apparatus comprises an array of at least four said substrates, each said substrate being associated with plural said fibers so that said fibers are situated upon said substrate so as to be at least slightly spaced apart, wherein:

at least a first said substrate is associated with plural said fibers which are approximately parallelly oriented in a generally first direction;

at least a second said substrate is associated with plural said fibers which are approximately parallelly oriented in a generally second direction which is about forty-five degrees removed from said generally first direction;

at least a third said substrate is associated with plural said fibers which are approximately parallelly oriented in a third direction which is about ninety degrees removed from said generally first direction; and at least a fourth said substrate is associated with plural said fibers which are approximately parallelly oriented in a generally fourth direction which is about ninety degrees removed from said generally second direction.

6. Apparatus for detecting as recited in claim 3, wherein said housing includes attachment means for attaching said fibers to said substrate.

7. Apparatus for detecting as recited in claim 6, wherein said housing includes a window which is at least substantially transparent and which is at least substantially made of an electrically nonconductive material, said window being for situation above said fibers so that said fibers are interposed between said substrate and said window.

8. Apparatus for detecting as recited in claim 7, wherein said apparatus comprises electrical contact means and lead means, and wherein said electrical contact means is for connecting said fibers to said lead means.

9. Apparatus for detecting as recited in claim 8, wherein said apparatus comprises circuitry for generating an electrical photosignal which is indicative of the excitation of charges in said fibers, said excitation of charges resulting from incident said infrared radiation, said lead means being for connecting said de vice to said circuitry.

10. Apparatus for detecting as recited in claim 9, wherein said circuitry includes load resistor means and voltage biasing means.

11. Apparatus for detecting as recited in claim 9, wherein said apparatus comprises preamplification means for receiving said photosignal signal and for generating an electrical preamplified signal which is indicative of said photosignal.

12. Apparatus for detecting as recited in claim 11, wherein said apparatus comprises:

amplification means for receiving said preamplified signal and for generating an amplified signal which is indicative of said preamplified signal;

processing means for receiving said amplified signal and for processing said amplified signal into information relating to said amplified signal; and display means being for representing said information in a visually intelligible form.

13. An infrared detection method, said method comprising:

providing plural devices, each said device including the combination of plural Niobium Trisulfide crystalline fibers and an insulative substrate, said insulative substrate having an approximately flat substrative surface, said fibers separately abutting said substrative surface; and positioning each said device relative to incident said radiation so that said substrative surface is approximately orthogonally facing said incident said radiation;

said substrative surfaces being approximately coplanar;

at least a first said device including said fibers which are generally disposed in a first direction; and at least a second said device including said fibers which are generally disposed in a second direction which differs from said first direction.

14. An infrared detection method, said method comprising:

providing at least four devices, each said device including the combination of plural Niobium Trisulfide crystalline fibers and an insulative substrate, said insulative substrate having an approximately flat substrative surface, said fibers separately abutting said substrative surface; and positioning each said device relative to incident said radiation so that said substrative surface is approximately orthogonally facing said incident said radiation;

said substrative surfaces being approximately coplanar;

at least a first said device including said fibers which are generally disposed in a first direction;

at least a second said device including said fibers which are generally disposed in a second direction which is approximately forty-five degrees removed from said first direction;

at least a third said device including said fibers which are generally disposed in a third direction which is approximately ninety degrees removed from said first direction; and at least a fourth said device including said fibers which arm generally disposed in a fourth direction which is approximately ninety degrees removed from said second direction.

* * * * *